(12) United States Patent
Trinh et al.

(10) Patent No.: US 6,545,854 B2
(45) Date of Patent: Apr. 8, 2003

(54) FRINGE-FIELD NON-OVERLAPPING-ELECTRODES DISCOIDAL FEED-THROUGH CERAMIC FILTER CAPACITOR WITH HIGH BREAKDOWN VOLTAGE

(75) Inventors: Hung Trinh, San Diego, CA (US); Daniel F. Devoe, San Diego, CA (US)

(73) Assignee: Presidio Components, Inc., San Diego, CA (US)

( * ) Notice: Subject to any disclaimer, the term of this patent is extended or adjusted under 35 U.S.C. 154(b) by 0 days.

(21) Appl. No.: 09/865,816

(22) Filed: May 25, 2001

(65) Prior Publication Data

US 2002/0175782 A1 Nov. 28, 2002

(51) Int. Cl.[7] ............................ H01G 4/35; H01G 4/005
(52) U.S. Cl. ....................................... 361/302; 361/303
(58) Field of Search ............................ 361/301.1–301.4, 361/302–305, 306.1–306.3, 307, 308.1, 309, 311, 312, 320, 321.1–321.5, 328–330

(56) References Cited

U.S. PATENT DOCUMENTS

| | | | |
|---|---|---|---|
| 4,148,003 A | 4/1979 | Colburn et al. | |
| 4,247,881 A | 1/1981 | Coleman | |
| 5,177,663 A * | 1/1993 | Ingleson et al. | ......... 361/321.2 |
| 5,333,095 A | 7/1994 | Stevenson et al. | |
| 5,751,539 A | 5/1998 | Stevenson et al. | |
| 5,822,174 A | 10/1998 | Yamate et al. | |
| 5,825,608 A | 10/1998 | Duva et al. | |
| 5,870,272 A | 2/1999 | Seifried et al. | |
| 5,905,627 A | 5/1999 | Brendel et al. | |
| 5,926,357 A | 7/1999 | Elias et al. | |
| 5,959,829 A | 9/1999 | Stevenson et al. | |
| 5,973,906 A | 10/1999 | Stevenson et al. | |
| 5,999,398 A | 12/1999 | Makl et al. | |
| 6,008,980 A | 12/1999 | Stevenson et al. | |
| 6,018,448 A | 1/2000 | Anthony | |
| 6,191,931 B1 | 2/2001 | Paspa et al. | |
| 6,208,501 B1 | 3/2001 | Ingalls et al. | |
| 6,414,835 B1 * | 7/2002 | Wolf et al. | ................. 361/302 |

* cited by examiner

Primary Examiner—Chau N. Nguyen
Assistant Examiner—Eric Thomas
(74) Attorney, Agent, or Firm—Wood, Herron & Evans, L.L.P.

(57) ABSTRACT

The size and placement of internal metallization areas as do collectively form each of two electrodes is improved in a typically discoidal feed-through ceramic filter capacitor having (i) multiple ceramic layers, (ii) a hole passing a wire that carries electrical signals which are to be filtered, (iii) metal lining the hole so as to make electrical contact with the wire, and (iv) an exterior metal band connected to ground. First internal metallization areas, each in the shape of a relatively smaller small-aperture disk, are centered about the body's hole in contact with the metal lining, each area being upon one of the body's multiple ceramic layers, the areas collectively serving as a first electrode of the capacitor. Second internal metallization areas, each in the shape of a relatively larger large-apertured disk also centered about the hole and upon one of the ceramic layers, make at their exterior edge surface electrical contact with the metal band, thereby to serve as a second electrode of the capacitor. The respective metallization areas of each electrode are both (i) spaced far apart by previous standards, and, preferably, (ii) are located upon alternating ceramic layers, making that any voltage breakdown path is necessarily both (i) long and with (ii) both radial and longitudinal components. According to this long path, the breakdown voltage is high, typically 3000–4000 volts, making the capacitor suitable for, inter alia, implanted cardiac defibrillators.

35 Claims, 2 Drawing Sheets

FRINGE-FIELD NON-OVERLAPPING-ELECTRODES DISCOIDAL FEED-THROUGH CERAMIC FILTER CAPACITOR WITH HIGH BREAKDOWN VOLTAGE

BACKGROUND OF THE INVENTION

1. Field of the Invention

The present invention generally concerns ceramic filter capacitors such as are most commonly discoidal in form.

The present invention particularly concerns the organization of internal electrodes within a discoidal feed-through ceramic filter capacitor so as to, by use of the electrodes' fringing fields, realize a compact capacitor of very high breakdown voltage.

2. Description of the Prior Art

The present invention will be seen to concern the size and placement of the internal electrodes within a multi-layer feed-through ceramic filter capacitor. Such a capacitor is commonly discoidal in shape, passing wires upon which are carried electrical signals to be filtered through one or more holes that are most commonly aligned to the axis of the disc. (Other geometries are, however, possible. See, for example, U.S. Pat. No. 5,822,174.) Typically multiple metal plate regions of each of a first, and of a second, electrode are typically located in partially overlapping positions upon alternating ceramic layers, thereby to create capacitance between these interleaved metal plate regions, and between the electrodes that are formed from the plate regions.

Capacitors so constructed are of particular use to filter electrical signals upon the wires and leads of implanted cardiac pacemakers and cardiac defibrillators. These latter devices use high voltages, commonly about 750 volts.

When the electrodes of a filter capacitor are subjected to high voltages—on the order of hundreds and, with safety margins, even thousands of volts—then their partially-overlapped metal plate regions are subject to develop voltage breakdown paths (1) through the ceramic to each other, and/or (ii) to oppositely-charged regions of the outside surface of the capacitor where electrical connections are made—all as is more thoroughly discussed in the DESCRIPTION OF THE PREFERRED EMBODIMENT section of this specification. According to this propensity, the alternating polarity metal plate regions of the two electrodes must be separated both (i) from each other, and (ii) from oppositely-charged regions at the exterior of the capacitor, by a reasonable thickness of ceramic.

Because (i) capacitance between spaced-parallel plate regions is a function of their separation, and (ii) plate density cannot be particularly high in a multi-layer capacitor where only an adequately thick ceramic buffer can insure such a high breakdown voltage as is desired, it has heretofore been believed that the metal plate regions of alternating polarity should be positioned (i) spaced-parallel (ii) in at least partial overlap along the axis of the discoidally-shaped ceramic body and of any hole(s) in this body. The simple reason that the metal plate regions are so located overlapping spaced parallel is so as to create capacitance along the elementary model of two parallel plate electrodes. Indeed, the formula for the capacitance of the conventional parallel-plate ceramic capacitor is:

$$Cap = \frac{kA}{d}$$

where Cap is the capacitance in farads, k is the dielectric constant in farads per meter, A is the area of electrode overlap in square meters and d is the distance of separation between plates in meters.

The present invention will be seen to show that capacitance suitable for filtering can be realized by an alternative metal plate configuration; a configuration that is much improved for voltage breakdown. A hallmark of this configuration, and of the present invention, will be seen to be the plate regions of each first and each second electrode pair (being that some filter capacitors can contain multiple electrodes) will be non-overlapping along the axis of the discoidally-shaped ceramic body, and along the axis of any hole(s) in this body.

Both the overlapping electrode plate regions of prior art multi-layer ceramic filter capacitors, and the multi-layer ceramic filter capacitors of the present invention totally lacking any such overlap in the, are highly visually distinctive (in views of the capacitor interiors). The overlapping of electrode plate regions is not much commented upon in the prior art, most likely because such has previously been deemed a fundamental and immutable basis of the construction of ceramic capacitors of all types—including feed-through filter capacitors. Accordingly, the next-following written descriptions of selected prior art patents, while amply showing the state of the art in multi-layer ceramic feed-through filter capacitors, do not deal directly with the present invention. The figures of these prior art patents do, however, clearly show that overlap of electrode plate regions that is obviated by the present invention.

For example, U.S. Pat. No. 4,148,003 to Colburn, et al. for a SERIES FEED-THROUGH CAPACITOR concerns a feed-through capacitor of the type for use in filters and the like and including discoidal ceramic capacitors arranged in stacked relationship and electrically connected in series. Series arrangement of the discoidal capacitors prevents shorting through the feed-through capacitor in the event of failure of one of the discoidal capacitors therein and results in substantially improved insertion loss characteristics when compared to feed-through capacitors having a single discoidal capacitor. Internal electrode metal plate regions are overlapping.

U.S. Pat. No. 5,333,095 to Stevenson, et al. for a FEED-THROUGH FILTER CAPACITOR ASSEMBLY FOR HUMAN IMPLANT concerns a feed-through filter capacitor assembly and related installation method are provided for shielding a conductive terminal pin or lead of the type used, for example, in an implantable medical device such as a heart pacemaker or defibrillator, against passage of external interference signals. The feed-through assembly includes a terminal pin subassembly having at least one terminal pin supported within a cylindrical conductive ferrule by a hermetically sealed insulator ring. The ferrule is adapted for mounting onto a conductive pacemaker housing, as by welding or brazing, to support the terminal pin for feed-through passage to the housing interior. A co-axial filter capacitor is mounted at an inboard side of the pacemaker housing, with capacitor electrode plate sets coupled respectively to the pacemaker housing and to the terminal pin by a conductive adhesive or the like. In one preferred form, multiple filter capacitors are provided in a substantially co-planar array within a common base structure, with each capacitor in association with a respective terminal pin. Internal electrode metal plate regions are again overlapping.

U.S. Pat. No. 5,751,539 also to Stevenson, et al. for an EMI FILTER FOR HUMAN IMPLANTABLE HEART DEFIBRILLATORS AND PACEMAKERS concerns an improved ceramic feed-through capacitor design which results in distinct advantages in EMI (electromagnetic interference) filtering and therapeutic wave form management for implantable defibrillators and pacemakers and the like. The invention provides ceramic capacitor electrode plate designs which provide both low impedance de-coupling for EMI suppression, and, at the same time provide an isolated common ground point through a separate coupling capacitor for electrical isolation of the filtered circuit from the metal case (usually titanium) of the defibrillator or the like. Such an arrangement allows the defibrillator HV (high voltage) output pulse to the heart to be referenced lead to lead (including reverse polarity), or from either lead to a common floating ground point or to the titanium case. The primary application of the invention is directed to implantable defibrillators where the output pulse to the heart is typically high voltage (up to 750 volts) and of short duration (typically in the $10^{-2}$ seconds, or 10 millisecond, range). The invention is equally applicable to implantable pacemakers. The invention is stated to be suited for a combination defibrillator (tachycardia) and pacemaker (bradycardia) unit where there are sense (heart monitoring), low voltage (pacing) and high voltage (defibrillator) output leads. Internal electrode metal plate regions are yet again overlapping.

U.S. Pat. No. 5,825,608 to Duva, et al. for a FEED-THROUGH FILTER CAPACITOR ASSEMBLY concerns a feed-through filter capacitor assembly is provided to pass a conductor into a housing of an electronic device while maintaining a hermetic seal and filtering spurious radio frequency signals. The assembly is particularly suitable for use in medical implant devices such as pacemakers. The feed-through filter capacitor assembly comprises a conductive bushing forming a cup that receives a filter capacitor body. The cup is located to one side of a pass-through portion including a passageway in which an insulating spacer is mounted. A plurality of wires pass through the filter capacitor body and spacer. The wires are contacted with inner plates of the capacitor and insulated from the bushing. Conductive polymer resin within the cup provides electrical continuity between outer contacts of the capacitor body and the conductive bushing. This arrangement also provides an effective heat sink for the filter capacitor body and protects the filter capacitor body from physical damage. The arrangement of a cup to the side of the pass-through portion allows sizing of the capacitor independently of the size of a housing hole provided to receive the assembly. Internal electrode metal plate regions are still yet again overlapping.

U.S. Pat. No. 5,999,398 to Maki, et al. for a FEED-THROUGH FILTER ASSEMBLY HAVING VARISTOR AND CAPACITOR STRUCTURE concerns a feed-through filter assembly such as may be used in an implantable medical device. The assembly includes a conductive mounting element which may be hermetically sealed to an outer housing of the implantable medical device. In many embodiments, the conductive mounting element will be a conductive canister in which a feed-through filter structure is located. Alternatively, the conductive mounting element may include a suitable sub-plate structure. Because the filter structure exhibits both varistor and capacitive characteristics, effective transient suppression and interference filtering is achieved in a single package. Secondary filtering may be provided downstream of the filter assembly for additional interference filtering at lower frequencies. Internal electrode metal plate regions are still yet again overlapping.

U.S. Pat. No. 6,008,980 again to Stevenson, et al. for a HERMETICALLY SEALED EMI FEED-THROUGH FILTER CAPACITOR FOR HUMAN IMPLANT AND OTHER APPLICATIONS concerns an integrated hermetically sealed feed-through capacitor filter assembly is provided for the shielding and de-coupling of a conductive terminal pin or lead of the type used, for example, in an implantable medical device such as a cardiac pacemaker or cardioverter defibrillator against passage of external interference signals, such as caused by digital cellular phones. The simplified feed-through assembly described herein eliminates the traditional terminal pin subassembly. In this novel approach, the ceramic feed-through capacitor itself forms a hermetic seal with a conductive pacemaker housing to which it is mounted by welding or brazing. The feed-through capacitor is configured such that its internal electrodes are not exposed to body fluids, with capacitor electrode plate sets coupled respectively to a conductive ferrule, pin or housing (which may be grounded) and to the non-grounded, or active, terminal pin(s) by conductive adhesive, soldering, brazing, welding or the like. In one preferred form, multiple feed-through filter capacitors are provided in a substantially coplanar array within a common base structure, with each capacitor in association with a respective terminal pin. Internal electrode metal plate regions are still yet again overlapping.

U.S. Pat. No. 5,905,627 to Brendel, et al. for an INTERNALLY GROUNDED FEED-THROUGH FILTER CAPACITOR concerns an internally grounded ceramic feed-through filter capacitor assembly that provides for the shielding and de-coupling of a conductive terminal pin or lead—of the type used, for example, in an implantable medical device such as a cardiac pacemaker or cardioverter defibrillator—against passage of external interference signals—such as those caused by digital cellular phones. The assembly includes a terminal pin subassembly having at least one terminal pin supported within a conductive ferrule by a hermetically sealed insulator structure. The ferrule is adapted for mounting onto a conductive substrate, such as a pacemaker housing, by welding or brazing to support the terminal pin subassembly for feed-through passage to the housing interior. A ceramic feed-through capacitor is mounted at an inboard side, with the capacitor electrode plate sets coupled respectively to a grounded lead and to the terminal pins(s) by conductive adhesive, soldering, brazing or the like. In preferred forms of the invention, multiple feed-through filter capacitors are provided in a substantially coplanar array within a common base structure, with each capacitor in association with a respective terminal pin. In this patent of Brendel, et al., the internal electrode metal plate regions are overlapping, as in all other patents.

SUMMARY OF THE INVENTION

The present invention contemplates organizing the internal electrodes within a feed-through ceramic filter capacitor, such as is commonly discoidal in shape, so as to, by use of the electrodes' fringing fields, realize a filter capacitor that, nonetheless to being compact, has a very high breakdown voltage. Capacitors so constructed are of particular use in implanted cardiac pacemakers and especially, in consideration of the higher voltages used, implanted cardiac defibrillators.

A quality ceramic electromagnetic interference/radio frequency interference (EMI/RFI) filter capacitor in accordance with the most preferred embodiments of the present invention typically has a breakdown voltage reliably in excess of 4,000 volts, which is at least two, and more likely three, times better than the best capacitors of the prior art which are known to the inventors.

1. A Ceramic Filter Capacitor with Improved Internal Electrodes

In one of its aspects the present invention is embodied in a ceramic filter capacitor with internal electrodes improved in their size and placement so as to accord a much higher breakdown voltage to the capacitor than heretofore.

In some detail, the preferred filter capacitor is made from multiple ceramic layers as aggregate a substantially planar body. At least one hole in the body passes a wire that carries electrical signals which are to be filtered. A first metal area serves to line the body's hole, and to make electrical contact with any wire within the hole. A second metal area serves as a band over at least part, and typically all, of an exterior edge surface of the body. This second metal band is suitably electrically connected to ground. So far the capacitor construction is conventional, and preferred filter capacitor of the present invention so constructed has a quite normal external appearance.

However, in accordance with the present invention a number of first internal metallization areas, each in the shape of a relatively-smaller small-aperture disk, are centered about the body's hole each upon one of the body's multiple ceramic layers. Each of these apertured disk metallization areas makes at its internal edge surface electrical contact with the metal lining of the hole, thereby to serve as a first electrode of the capacitor.

Meanwhile, a number of second internal metallization areas, each in the shape of a relatively-larger large-apertured disk, are centered about the body's hole each upon one of the body's multiple ceramic layers. Each of these second metallization areas makes at its exterior edge surface electrical contact with the second metal band, thereby to serve as a second electrode of the capacitor.

Importantly, the first internal metallization areas as collectively constitute the first electrode, and the second internal metallization areas as collectively constitute the second electrode, are separated from each other in radial displacement from an imaginary centerline of the body's hole. This radial separation is typically large relative to both the minimum separations (i) between electrodes of opposite polarity, and (ii) between an internal electrode of one polarity and an external metal area of the other polarity, arising within discoidal feed-through EMI/RFI ceramic filter capacitors of the prior art. The larger separation between the electrodes of new geometry gives a higher breakdown voltage.

In user of this capacitor structure (i) upon electrical connection of the first metal to a wire passing through the hole, and (ii) upon electrical connection of the second metal to ground, a first fringing electrical field is developed at and between the first internal metallization areas, and a second fringing electrical field is developed at and between the second internal metallization areas. The metallization areas, and their fringing electrical fields, are internal within the ceramic body. A capacitance comparable with the capacitance of prior art feed-through capacitors is developed between these first and second fringing electrical fields. This capacitance is fully suitable to filter electromagnetic interference/radio frequency interference (EMI/RFI) present in electrical signals upon the wire.

The filter capacitor of the present invention is thus different not only in the sizes and the placement of its metallization areas, or electrodes, within the ceramic body, but by its intentional use, and coupling, of fringing fields as a primarily basis of a capacitance developed between the two electrodes. This is unusual: fringing fields are no longer secondary, but are rather primary, to capacitor performance.

The separation (i) between each two electrodes of a pair, and (ii) between any of the metallization areas as do collectively form one of the electrodes and those metallization areas as do collectively form the other one of the electrodes, is quite great relative to the separations arising between (i) the two electrodes, and (ii) the metallization areas, of previous ceramic filter capacitors. Accordingly, the breakdown voltage of a ceramic filter capacitor so constructed is already superior. However, in accordance with the present invention, the strength of the dielectric separation between opposite electrodes is still further improved.

Namely, the electrode metallization areas, or plates, are preferably located upon alternating layers. This makes an embodiment where any path of voltage breakdown will have to penetrate radially through, as well as transversely along, at least one ceramic layer. Voltage breakdown along such a path in two—both radial and longitudinal—directions at the same time is strongly resisted, giving this embodiment of a multi-layer ceramic feed-through capacitor in accordance with the present invention an even higher breakdown voltage than the already impressively increased breakdown voltage of the basic embodiment of the invention.

2. A Ceramic Filter Capacitor Improved for the Strength of Dielectric Separation Between Electrodes In another of its aspects the present invention may be considered to be embodied in a ceramic filter capacitor improved for the strength of dielectric separation between its internal electrodes. The material or nature of the capacitor dielectric—ceramic—is not changed: the size and placement of the metallization regions—which regions in aggregate produce each of the electrodes—is instead improved. The metallization regions are sized and placed so as to make that any path by which the capacitor will suffer breakdown will have a much greater resistance (requiring a much higher voltage to induce breakdown) than heretofore.

The basic approach is (1) to separate the metallization areas widely—as first described in section 1. above—plus (2) to place each metallization region of each electrode on a separate ceramic layer from the metallization regions of the other electrode. The several metallization regions of each electrode are interleaved, with each metallization layer of each electrode being both (i) radially and (ii) longitudinally separated from the metallization areas of the other-electrode.

Accordingly, a ceramic filter capacitor so constructed has (1) its first internal metallization areas upon a first group of the multiple ceramic layers, (2) its second internal metallization areas upon a second group of the multiple ceramic layers, and (3) its first group of ceramic layers and first internal metallization areas interleaved with the second group of ceramic layers and second metallization areas. By this construction the first and the second metallization areas are never on the same ceramic layer, but are always separated, first metallization area to second metallization area, not only by the radial distance of separation, but also by a thickness of at least one ceramic layer.

Still further in accordance with the present invention, the ceramic filter capacitor may be constructed in diverse shapes, including in (i) the substantial shape of an apertured disk with one substantially central hole, or in (ii) the substantial shape of a multi-apertured substantially planar body with multiple holes each of which is capable of accepting at least one lead or wire. Regardless of the particular capacitor shape, the placement of the hole(s), such as by process of drilling, is not particularly dimensionally critical—as it has been in the past—because the holes simply pass into internal disk-shaped metallization areas (part of the first electrode) that are substantially larger than is the hole.

3. A Feed-Through Multi-layer Ceramic Filter Capacitor with Non-Overlapping Electrodes According to the unique placement of the electrodes with feed-through multi-layer ceramic filter capacitors in accordance with the present invention, the invention may be broadly conceived to be embodied in a ceramic filter capacitor that is improved for the strength of dielectric separation between its internal electrodes.

It will be recognized that a common-form, prior art, multi-layer ceramic feed-through filter capacitor commonly has (1) a substantially monolithic body of layered ceramic dielectric material with at least one hole, suitable to accept an electrical conductor, passing through at least some layers of the body; (2) a number of conductive first electrode plates, encased within the body on an associated plurality of ceramic layers, electrically connectable to an electrical conductor within the hole; and (3) a number of conductive second electrode plates, encased within the body on an associated plurality of ceramic layers, electrically connectable to ground.

In this general structure the present invention is characterized in that the first plurality of conductive first electrode plates are spatially non-overlapping with the second plurality of conductive second electrode plates along any imaginary axis that is parallel to an axis of the hole.

These non-overlapping plates can be upon the same, or upon different, ceramic layers. Namely, and as a first alternative, at least some of the ceramic layers associated with the conductive first electrode plates can be the selfsame ceramic layers as are associated with the conductive second electrode plates. This makes that at least some of the conductive first, and the conductive second, electrode plates will be upon the same ceramic layers.

Alternatively, it can be that none of the ceramic layers associated with the conductive first electrode plates are the same as any ceramic layers associated with the conductive second electrode plates. This makes that at least one ceramic layer located between each conductive first, and each conductive second, electrode plate.

4. An Improvement to Discoidal Feed-Through Multi-Layer Ceramic Filter Capacitor Still yet another way of describing the unique placement of the electrodes with feed-through multi-layer ceramic filter capacitors in accordance with the present invention is as follows.

The invention may be broadly conceived to be embodied in a feed-through filter capacitor having (1) a substantially discoidal dielectric body with (1a) a major axis, (1b) at least one hole, aligned parallel to the major axis, suitable to accept an electrical conductor, and (1c) an external rim region. The capacitor further has (2) a first set of electrodes, located spaced-parallel within the body transverse to the body's axis, electrically connected to an electrical conductor within the hole, and (2) a second set of electrodes, also located spaced-parallel within the body transverse to the body's axis, electrically connected to ground at the body's rim. The electrical conductor is "fed through" the body's hole. This "feed-through" capacitor structure serves to filter to ground any electrical signal upon the electrical conductor fed through the body's hole. All this is conventional.

To this structure the present invention constitutes an improvement wherein the first set of electrodes are non-overlapping with the second set of electrodes along any imaginary axis parallel to the axis of the at least one hole. This "non-overlapping" simply means that no imaginary axis parallel to the axis of the at least one hole will pass through both an electrode of the first set and, also, and electrode of the second set.

The substantially discoidal dielectric body is preferably multi-layer ceramic, with the first and the second sets of electrodes being metal upon the ceramic layers.

As in section 3., above, the first and the second sets of electrodes may be upon either the same, or different, ones of the ceramic layers. Location of the electrodes on different, interleaved, layers is preferred.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow.

DESCRIPTION OF THE PREFERRED EMBODIMENT

The following description is of the best mode presently contemplated for the carrying out of the invention. This description is made for the purpose of illustrating the general principles of the invention, and is not to be taken in a limiting sense. The scope of the invention is best determined by reference to the appended claims.

Although specific embodiments of the invention will now be described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

In the design of multi-layer capacitors the electrode plates are commonly overlapped so as to derive the highest capacitance. The formula for capacitance is:

$$Cap = \frac{kA}{d}$$

where Cap is the capacitance in farads, k is the dielectric constant in farads per meter, A is the area of electrode overlap in square meters and d is the distance of separation between plates in meters. Although d would desirably be minimized for greatest capacitance, for high voltage capacitors d cannot be indefinitely small or else the capacitor will be subject to failure from voltage breakdown of the insulating ceramic dielectric.

Figure 1A:
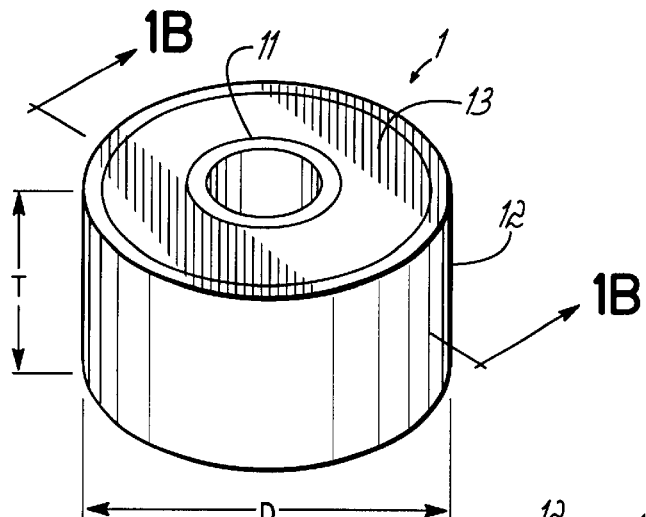
FIG. 1a is a diagrammatic perspective view showing a prior art ceramic discoidal feed-through ceramic filter capacitor.
Figure 1B:
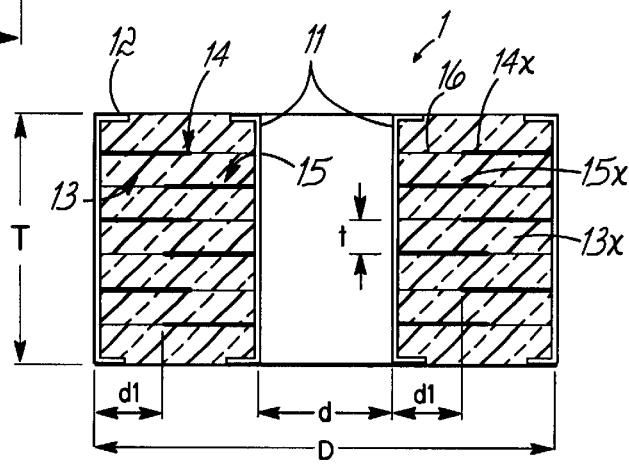
FIG. 1b is a cut-away plan view of the internal electrode structure of this prior art capacitor.

For example, a typical prior art multi-layer ceramic feed-through capacitor 1 is shown in perspective view in FIG. 1a, and in cut-away side plan view in FIG. 1b. The capacitor 1 has a central hole, or bore, that is typically surfaced with first conductive metal 11, and external rim surface, or circumference, that is typically surfaced with a second conductive metal 12. Conductive metals 11 and 12 may be the same type of metal. Inside the capacitor 1, which is substantially made from multiple layers 13x of ceramic 13, are a number of ring-shaped first metallization areas, or plates, 14x as do constitute in aggregate a first electrode 14, and a number of ring-shaped second metallization areas, or plates, 15x as do constitute in aggregate a second electrode 15.

The external diameter D of the prior art multi-layer ceramic feed-through capacitor 1 of FIG. 1 is typically about 0.105 inch, the internal diameter d about 0.035 inch, and the overall thickness T about 0.065 inch. A typical ceramic dielectric will have a voltage breakdown rating of 100 volts per mil thickness. For a capacitor 1 designed for 1000 volts breakdown voltage, a typical ceramic dielectric thickness t between adjacent plates 11, 12 will thus be 0.010 inch.

Another aspect of high voltage ceramic capacitor design is that the distance d1 of separation between any electrode 14, 15 and respective external metal 11, 12 along the direction of the layers 13x—the horizontal direction in FIG. 1b—should be 50% greater than in the direction transverse to these layers 13x, or the vertical direction in FIG. 1b. This is because voltage breakdown in more likely to occur along the unavoidable imperfections of the seam 16 between layers 13x. This requires that the distance d1 should be 1.5't=1.5'(0.010 inch)=0.015 inch.

The complete internal design of the prior art feed-through multi-layer ceramic capacitor 1 shown in FIG. 1b for a 1000 volt rating thus dictates a 0.010 inch layer-to-layer thickness t, and a 0.015 inch end margin dl (to both electrodes 14, 15). According a 7.5 mil ceramic cover on the top and the bottom of the capacitor 1, the number of active internal plates 14x, 15x is thus three of each polarity, with a total overlapping area A of $((0.0375)^2-(0.0325)^2)\pi=(0.001406-0.001506)\pi=0.00035\pi=0.001099$ square inches.

Especially when the thickness t grows large—as it must to prevent voltage breakdown in available ceramic materials at high electrode voltage differentials—a substantial portion of the overall capacitance starts to accrue from what is called the "fringe effect". Fringe effect capacitance is always present in, inter alia, (i) the end of each plate 14x, 15x of the respective electrodes 14, 15 and (ii) the respective exterior metal 11, 12 termination of opposite polarity. It is simply that when the capacitor is used at a lower voltage, and smaller plate-to-plate spacing t, then this fringe capacitance is a negligible contribution to the overall capacitance, and is disregarded. However, in a high voltage multi-layer ceramic capacitor 1 with relatively large plate-to-plate spacing t the fringe capacitance commences to be a sizable, measurable, portion of the total capacitance.

In the discoidal feed-through capacitors 2–4 of the present invention—shown in FIGS. 2–5, this "fringe effect" capacitance is put to beneficial use. Indeed, multi-layer ceramic capacitors in accordance with the present invention are constructed specifically so as to maximize this fringe effect, as exemplified by a first preferred embodiment of a capacitor 2 in accordance with the present invention shown in FIG. 2 (and FIG. 3). The exterior, and exterior measurements, of the capacitor 2 may be, as shown in FIG. 2a, identical to the prior art capacitor 1 shown in FIG. 1a. The mode and manner of electrical connection is likewise the same. This general principle is the same for multi-layer ceramic capacitors of diverse other form factors: the present invention concerns the electrode plates 24x, 25x on the interior of the capacitor 2.

Figure 2A:
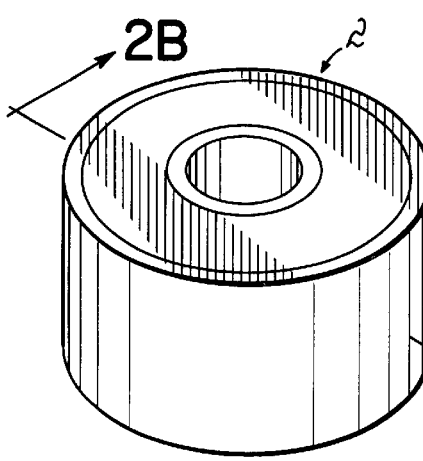
FIG. 2a is a diagrammatic perspective view showing a first preferred embodiment of a ceramic discoidal feed-through ceramic filter capacitor with high breakdown voltage in accordance with the present invention.
Figure 2B:
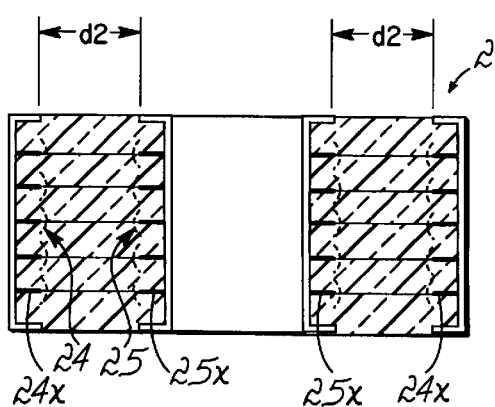
FIG. 2b is a cut-away plan view of the internal electrode structure of this capacitor.

In the preferred first embodiment of a capacitor 2 in accordance with the present invention as illustrated in cross-sectional side view in FIG. 2b, the number of plates of each electrode 24, 25 is typically two to three times (×2–×3) the number of electrode plates 14x, 15x in the prior art capacitor 1 (shown in FIG. 1). The plates 24x, 25x are desirably placed as closely as is practical (necessitating an increased number of relatively thinner ceramic layers 23x) so that the combined plates 24x and 25x act nearly as continuously vertical electrodes 24, 25. With sufficiently numerous, and closely spaced, horizontal electrode plates the electric field lines of (the plates of) each electrical polarity merge, and capacitance can effectively be calculated as the area of, and distance between, two cylinders. The effective area of the new design capacitor 2 of the present invention is $\pi \times d \times h = (3.14) \times (0.070) \times (0.060) = 0.01318$ in$^2$, or approximately twelve times (×12) the area of the conventional prior art capacitor 1 of FIG. 1.

In reality, the capacitance of the capacitor 2 of the present invention is not twelve times (×12) as much as the prior art capacitor 1 because there is some contribution by "fringe effect" capacitance in the capacitor 1 of conventional design. However, when comparing such capacitors as do achieve essentially identical capacitance, the capacitor 2 of the present invention enjoys a significantly higher breakdown voltage. This is first because, as illustrated for a typical first embodiment capacitor 1 in FIGS. 2b and 3, and the second embodiment capacitor 3 shown in FIG. 4, for a typical 0.0075 inch extension of the plates toward each other there is a distance of separation d2 between the electrode plates 24x, 25x of opposite polarities that is typically about (0.035–0.0075–0.0075) inch=0.020 inch, or twice (×2) the typical 0.010 inch electrode (minimum) separation for a typical 1000 volt prior art capacitor 1 as shown in FIG. 1.

The "fringe effect" electric field is attempted to be illustrated in FIG. 2b by the "arcs" appearing around the interior butt ends of the electrode plates 24x, 25x of the capacitor 2. These illustrated "arcs" do not represent any physical structure.

Figure 3:
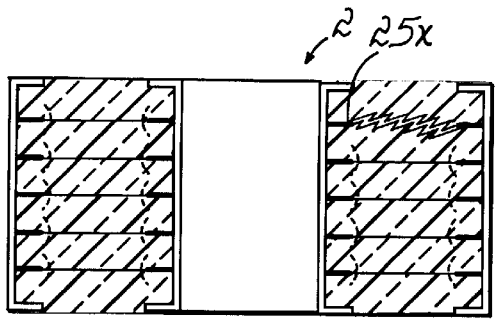
FIG. 3 is a detail cut-away plan view showing the internal electrodes of a laminated first preferred embodiment of a ceramic discoidal feed-through ceramic filter capacitor with high breakdown voltage in accordance with the present invention, which first embodiment capacitor was previously seen in FIG. 2.
Figure 4:
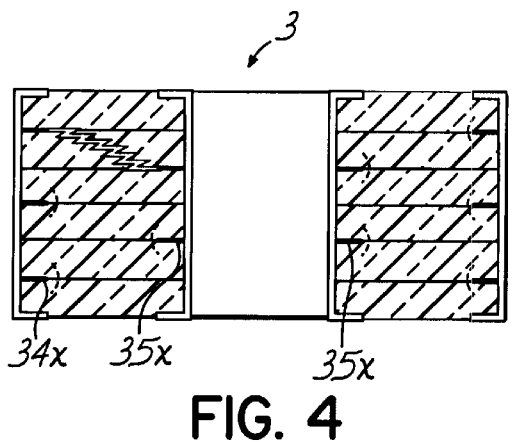
FIG. 4 is a detail cut-away plan view showing the internal electrodes of a second, most preferred, embodiment of a laminated ceramic discoidal feed-through ceramic filter capacitor with high breakdown voltage in accordance with the present invention.

Still further the present invention contemplates placing the successive plates 34x, 35x of each electrode 34, 35 on alternating layers, as illustrated for the second embodiment capacitor 3 in FIG. 4. The first embodiment capacitor 2 of FIGS. 2b and, in greater detail wherein the laminations of the multi-layer ceramic may be imagined in FIG. 3, can suffer voltage breakdown at, and along—inter alia—the path shown in jagged line in FIG. 3. This path is along a boundary of the laid-up laminated layers of the multi-layer ceramic body. Despite the considerable distance of this breakdown path, it is relatively more susceptible to failure than is any voltage breakdown path proceeding through a ceramic layer 23x.

Consider now the most-preferred second embodiment of a capacitor 3 in accordance with the present invention shown in FIG. 4. The plates of each electrode—interior and exterior—are upon alternating ceramic layers 33x. A potential voltage breakdown path is again shown in jagged line in FIG. 4. Proceeding of necessity both along (i.e., in the horizontal direction in FIG. 4), and through (i.e., in the vertical direction in FIG. 4), a boundary between laid-up ceramic layers 33x, this failure path is uncommon, and will not normally occur until extreme voltages are reached.

Capacitors 2, 3 in accordance with the present invention having identical form factors and materials to the prior art capacitor 1 reliably double the (×2) voltage breakdown threshold from the previous 1,000 volts to 2,000 volts and more. Entire production batches of capacitors 3 test to 3,000 volts, and selected individual capacitors 3 test in excess of 4,000 volts.

The principles of the present invention are readily extended to multi-layer ceramic feed-through capacitors of alternative configurations. For example, the common "race-track" discoidal form capacitor 4 of FIG. 5a accommodates six leads, or wires (not shown) carrying electrical signals that are to be filtered. In accordance with the present invention, a typical internal plate 44x of one electrode 44, normally the ground, will look as shown in top plan cutaway view in FIG. 5b, and a plate 45x of the other electrode 45 can look as shown in FIG. 5c.

Figure 5A:
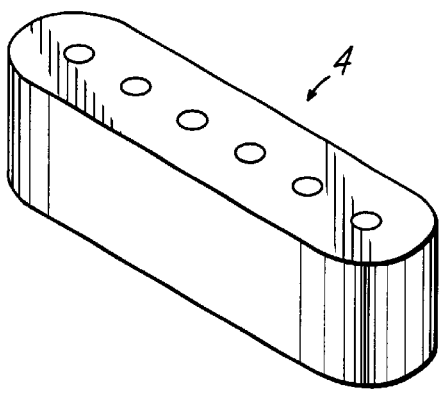
FIG. 5a is a perspective view of a multi-hole ceramic filter capacitor with high breakdown voltage in accordance with the present invention.
Figure 5B:
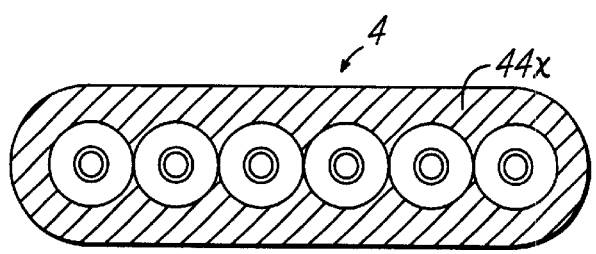
FIG. 5b is a top plan view of a typical first, ground, exterior metallization plane area of this capacitor.
Figure 5C:
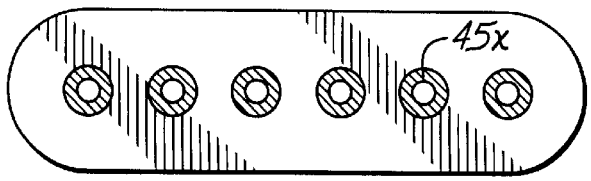
FIG. 5c is a top plane view of a typical second, interior, metallization plane area of this capacitor.

Note that plates 45x of the internal electrode 45 are shown somewhat abbreviated in annular width in FIG. 5c relative to the width that they had in, for example, FIGS. 2b, 3 and 4. A practitioner of the art of capacitor design will recognize that a juxtaposition of the fringing fields of the internal electrodes of each polarity, as is best shown in FIG. 2b, is what is desired, and that this can be realized without being hidebound as to the size and extent of the internal electrodes, or plates. The interior electrode might in particular be smaller because there will be some fringing fields directly to the wire, or lead, that passes through the central hole.

Note also that any misalignment of the central hole in the classic prior art feed-through filter capacitor 1 of FIG. 1 degraded capacitor performance both in (i) capacitance and (ii) breakdown voltage. New construction feed-through filter capacitors 2–4 in accordance with the present invention as shown in FIGS. 2–5 are relatively immune to the placement of the central hole(s). So long as the plates of the central electrode 25, 35, 45—normally considerably larger than is the hole—are reliably contacted, capacitor performance does not much vary with hole, or holes, misalignment(s). (The small annulus of the interior electrode of FIG. 5c requires somewhat greater accuracy in the placement of the hole relative to the inner interior electrode—but even if the hole (and the wire, or lead, passing therethrough) was to be so far off center so as break the annulus of an inner interior electrode plate 45x the capacitor would still work!)

In accordance with the preceding explanation, variations and adaptations of the feed-through multi-layer ceramic filter capacitors with improved electrode structures in accordance with the present invention will suggest themselves to a practitioner of the ceramic capacitor design arts. For example, the layers need not be laminated, but could be created as a toroidal winding about single central hole.

In accordance with these and other possible variations and adaptations of the present invention, the scope of the invention should be determined in accordance with the following claims, only, and not solely in accordance with that embodiment within which the invention has been taught.

What is claimed is:

1. A feed-through multi-layer ceramic filter capacitor comprising:
   a substantially monolithic body of layers of ceramic dielectric material with at least one electrical contact in a hole suitable to accept an electrical conductor passing through at least some layers of the dielectric material first electrode plates electrically connected to the one electrical contact in the hole, each of the first electrode plates being disposed on a layer of dielectric material within the body, and
   second electrode plates electrically connected to a ground, each of the second electrode plates being disposed on a layer of dielectric material within the body, the second electrode plates forming the capacitor with the first electrode plates without any intervening electrode plates and the second electrode plates spatially non-overlapping with the first electrode plates along any imaginary axis parallel to an axis of the hole.

2. The feed-through multi-layer ceramic filter capacitor according to claim 1 wherein each of the first electrode plates is disposed on a different layer of dielectric material and each of the second electrode plates is disposed on a layer of dielectric material common to one of the first electrode plates.

3. The feed-through multi-layer ceramic filter capacitor according to claim 1 wherein each of the first and second electrode plates is disposed on a different layer of dielectric material.

4. In a feed-through filter capacitor
   a substantially discoidal dielectric body having
      a plurality of stacked layers of dielectric material,
      a major axis extending centrally through the discoidal dielectric body,
      at least one hole aligned parallel to the major axis and adapted to accept an electrical conductor, and
      an external rim region;
   a first set of electrodes located within the body transverse to the major axis, each of the first electrodes being disposed on a layer of dielectric material and adapted to be electrically connectable to an electrical conductor within the at least one hole; and
   a second set of electrodes located within the body transverse to the major axis, each of the second electrodes being disposed on a layer of dielectric material and adapted to be electrically connectable to ground at the body's rim; so as to filter to ground any electrical signal upon any electrical conductor fed through the body's hole, the second set of electrodes forming the capacitor with the first set of electrodes without any intervening electrode plates, and the first set of electrodes non-overlapping with the second set of electrodes along any imaginary axis parallel to the major axis.

5. The feed-through filter capacitor according to claim 4 wherein the first and the second sets of electrodes being metal upon the ceramic layers.

6. The feed-through filter capacitor according to claim 5 wherein each of the first set of electrodes is disposed on a different layer of dielectric material and each of the second set of electrodes is disposed on a layer of dielectric material common to one of the first set of electrodes.

7. The feed-through filter capacitor according to claim 5 wherein each of the first and second electrode plates is disposed on a different layer of dielectric material.

8. A feed-through ceramic filter capacitor comprising:
   multiple ceramic layers forming a body;
   at least one hole in the body adapted to receive an electrical conductor carrying electrical signals to be filtered;
   a first metal lining the at least one hole and adapted to electrically contact an electrical conductor within the hole;
   a plurality of first metallization areas in the shape of apertured disks and having respective apertures centered about the at least one hole upon respective ceramic layers, each first metallization area making at an aperture edge surface electrical contact with the metal lining of the hole so as to serve as a first electrode of a capacitor;

a metal band extending over at least part of an exterior edge surface of the body, the metal band adapted to be electrically connected to ground;

a plurality of second metallization areas having respective apertures centered about the at least one hole upon respective ceramic layers, each second metallization area making at its exterior edge surface electrical contact with the second metal band so as to serve as a second electrode of a capacitor;

the plurality of first metallization areas collectively constitute a first electrode, and the plurality of second metallization areas collectively constitute a second electrode separated from the first electrode radially from a centerline of the body's hole; and wherein upon the electrical connection of the first metal to an electrical conductor passing through the at least one hole, and electrical connection of the second metal to ground, a first fringing electrical field is developed at and between the plurality of first metallization areas, and a second fringing electrical field is developed at and between the plurality of second metallization areas, and a fringe-effect capacitance is created by the first and second fringing fields suitable for filtering electromagnetic interference/radio frequency interference existing in electrical signals upon the electrical conductor.

9. The ceramic filter capacitor according to claim 8 wherein the plurality of first internal metallization areas are upon a first plurality of the multiple ceramic layers;

wherein the plurality of second internal metallization areas are upon a second plurality of the multiple ceramic layers; and wherein the first plurality of the multiple ceramic layers is interleaved with the second plurality of the multiple ceramic layers, making that the first and the second metallization areas are never on the same layer, but are always separated, first metallization area to second metallization area, not only by the radial distance of separation, but also by a thickness of a ceramic layer.

10. The ceramic filter capacitor according to claim 8 wherein the body has one substantially central hole.

11. The ceramic filter capacitor according to claim 8 wherein the body has multiple holes each of which is capable of accepting at least one wire.

12. A feed-through filter capacitor comprising:

layers of dielectric material having at least one hole passing therethrough;

first electrodes disposed on layers of the dielectric material and extending in a first direction substantially perpendicular to a centerline of the at least one hole;

second electrodes disposed on layers of the dielectric material and extending in the first direction; and the layers of dielectric material being sufficiently thin and the first and second electrodes being sufficiently numerous that a capacitor is formed substantially wholly by fringe-effect capacitance between the first and second electrodes.

13. The feed-through filter capacitor of claim 12 wherein the layers of dielectric material are a ceramic dielectric material.

14. The feed-through filter capacitor of claim 13 wherein the layers of dielectric material comprise a body of the feed-through filter capacitor having an external surface and the feed-through filter capacitor further comprises:

a first electrode contact connected to the first electrodes and formed over a portion of the external surface, the first electrode contact adapted to be electrically connectable to an external contact; and a second electrode contact electrically connected to the second electrodes and disposed in the at least one hole, the second electrode contact adapted to be electrically connectable to an electrical conductor extending through the at least one hole.

15. The feed-through filter capacitor of claim 14 wherein each of the first electrodes being disposed on a layer of the dielectric material; and each of the second electrodes being disposed on the layer of the dielectric material with a respective one of the first electrodes.

16. The feed-through filter capacitor of claim 14 wherein each of the first electrodes being disposed on a first layer of the dielectric material; and each of the second electrodes being disposed on a second layer of dielectric material different from the first layer.

17. A feed-through filter capacitor comprising:

layers of dielectric material forming a body having an external surface and having a hole passing therethrough;

a first electrode contact formed over a portion of the external surface and adapted to be electrically connectable to an external contact;

a second electrode contact disposed in the hole and adapted to be electrically connectable to an electrical conductor extending through the hole;

spatially overlapping first electrodes disposed on layers of the dielectric material and electrically connected to the first electrode contact; and spatially overlapping second electrodes disposed on layers of the dielectric material and electrically connected to the second electrode contact, wherein all electrodes in the capacitor spatially overlapping the second electrodes are connected to the second electrode contact.

18. The feed-through filter capacitor of claim 17 wherein all electrodes in the capacitor spatially overlapping the first electrodes are connected to the first electrode contact.

19. The feed-through filter capacitor of claim 17 wherein a capacitor is formed substantially wholly by fringe-effect capacitance between the first and second electrodes.

20. The feed-through filter capacitor of claim 17 wherein the dielectric material is a ceramic dielectric material.

21. The feed-through filter capacitor of claim 17 wherein each of the first electrodes being disposed on a layer of the dielectric material; and each of the second electrodes being disposed on the layer of the dielectric material with a respective one of the first electrodes.

22. The feed-through filter capacitor of claim 17 wherein each of the first electrodes being disposed on a first layer of the dielectric material; and each of the second electrodes being disposed on a second layer of dielectric material different from the first layer.

23. A feed-through filter capacitor comprising:

layers of dielectric material forming a body having an external surface and having a hole passing therethrough;

a first electrode contact formed over a portion of the external surface and adapted to be electrically connectable to an external contact;

a second electrode contact disposed in the hole and adapted to be electrically connectable to an electrical conductor extending through the hole;

spatially overlapping first electrodes disposed on layers of the dielectric material and electrically connected to the first electrode contact; and spatially overlapping second electrodes disposed on layers of the dielectric material and electrically connected to the second electrode contact, wherein all electrodes in the capacitor spatially overlapping the first electrodes are connected to the first electrode contact.

24. A feed-through filter capacitor comprising:

layers of dielectric material having at least one hole passing therethrough;

first electrodes disposed on layers of the dielectric material and extending in a first direction substantially perpendicular to a centerline of the hole;

second electrodes disposed on layers of the dielectric material and extending in the first direction, the second electrodes forming a capacitor with only the first electrodes; and any one of the first and second electrodes being non-overlapping with any of an other of the first and second electrodes in a second direction substantially parallel to a centerline of the hole.

25. A feed-through filter capacitor comprising:

layers of dielectric material having at least two holes passing therethrough;

first electrodes disposed on layers of the dielectric material and extending in a first direction substantially perpendicular to a centerline of the hole;

second electrodes disposed on layers of the dielectric material and extending in the first direction;

third electrodes disposed on layers of the dielectric material and extending in the first direction; and the layers of dielectric material being sufficiently thin and the first, second and third electrodes being sufficiently numerous that a first capacitor is formed substantially wholly by fringe-effect capacitance between the first and second electrodes, and a second capacitor is formed substantially wholly by fringe-effect capacitance between the first and third electrodes.

26. The feed-through filter capacitor of claim 25 wherein the dielectric material are a ceramic dielectric material.

27. The feed-through filter capacitor of claim 26 wherein the layers of dielectric material comprise a body of the feed-through filter capacitor having an external surface and the feed-through filter capacitor further comprises:

a first electrode contact connected to the first electrodes and formed over a portion of the external surface, the first electrode contact adapted to be electrically connectable to an external contact;

a second electrode contact connected to the second electrodes and disposed in a first hole, the second electrode contact adapted to be electrically connectable to an electrical conductor extending through the first hole; and a third electrode contact connected to the third electrodes and disposed in a second hole, the third electrode contact adapted to be electrically connectable to an electrical conductor extending through the second hole.

28. The feed-through filter capacitor of claim 27 wherein each of the first electrodes being disposed on a layer of the dielectric material; and each of the second electrodes being disposed on the layer of the dielectric material with a respective first electrode; and each of the third electrodes being disposed on the layer of the dielectric material with the respective first electrode.

29. The feed-through filter capacitor of claim 27 wherein each of the first electrodes being disposed on a first layer of the dielectric material; and each of the second electrodes being disposed on a second layer of the dielectric material different from the first layer; and each of the third electrodes being disposed on the second layer of the dielectric material with a respective second electrode.

30. A feed-through filter capacitor comprising:

layers of dielectric material forming a body having an external surface and having a plurality of holes passing therethrough;

a first electrode contact formed over a portion of the external surface and adapted to be electrically connectable to an external contact;

second electrode contacts, each of the second electrode contacts being disposed in a different one of the holes and adapted to be electrically connectable to an electrical conductor extending through the one of the holes;

spatially overlapping first electrodes disposed on layers of the dielectric material and electrically connected to the first electrode contact; and spatially overlapping sets of second electrodes, each set of second electrodes being disposed on layers of the dielectric material and electrically connected to a respective one of the second electrode contacts, wherein all electrodes in the capacitor spatially overlapping a set of second electrodes are connected to the respective one of the second electrode contacts.

31. The feed-through filter capacitor of claim 30 and all electrodes in the capacitor spatially overlapping the first electrodes are connected to the first electrode contact.

32. The feed-through filter capacitor of claim 30 wherein capacitors are formed substantially wholly by fringe-effect capacitance between the first electrodes and each set of second electrodes.

33. The feed-through filter capacitor of claim 30 wherein the dielectric material is a ceramic dielectric material.

34. The feed-through filter capacitor of claim 30 wherein each of the first electrodes being disposed on a layer of the dielectric material; and each set of second electrodes being disposed on the layer of the dielectric material with a respective one of the first electrodes.

35. The feed-through filter capacitor of claim 30 wherein each of the first electrodes being disposed on a first layer of the dielectric material; and each set of second electrodes being disposed on a second layer of dielectric material different from the first layer.

* * * * *

UNITED STATES PATENT AND TRADEMARK OFFICE
CERTIFICATE OF CORRECTION

PATENT NO.     : 6,545,854 B2
DATED          : April 8, 2003
INVENTOR(S)    : Trinh et al.

It is certified that error appears in the above-identified patent and that said Letters Patent is hereby corrected as shown below:

Column 1,
Line 38, subparagraphs do not match. Please delete "(1)", and insert therefor -- (i) --.

Column 2,
Line 13, after "any such overlap", delete "in the".
Line 41, after "installation method", delete "are".

Column 3,
Line 23, after "capacitor assembly", delete "is".
Line 66, after "filter assembly", delete "is".

Column 4,
Line 39, delete "pins(s)", and insert therefor -- pin(s) --.

Column 5,
Line 43, delete "user", and insert therefor -- use --.
Line 61, delete "primarily", and insert therefor -- primary --.

Column 6,
Line 38, delete "other-electrode", and insert therefor -- other electrode --.

Column 7,
Line 47, subparagraphs do not match. Please delete "(2)", and insert therefor -- (3) --.
Line 59, after "first set and, also," delete "and".

Column 9,
Line 35, delete "1.5' t =1.5' (0.010 inch)" and insert therefor -- 1.5 t=1.5 (0.010 inch) --.

Column 15,
Line 24, delete "an other", and insert therefor -- another --.
Line 46, after "Claim 25 wherein the", insert -- layers of --.

UNITED STATES PATENT AND TRADEMARK OFFICE
CERTIFICATE OF CORRECTION

PATENT NO. : 6,545,854 B2
DATED : April 8, 2003
INVENTOR(S) : Trinh et al.

It is certified that error appears in the above-identified patent and that said Letters Patent is hereby corrected as shown below:

<u>Column 16,</u>
Line 34, paragraph indents are not correct. After "first electrode contact; and", begin a new paragraph with "spatially".

Signed and Sealed this

Fourth Day of November, 2003

JAMES E. ROGAN
*Director of the United States Patent and Trademark Office*